June 1, 1937.  A. C. LINDBLOOM  2,082,583
FUEL SAVING DEVICE
Filed June 2, 1934
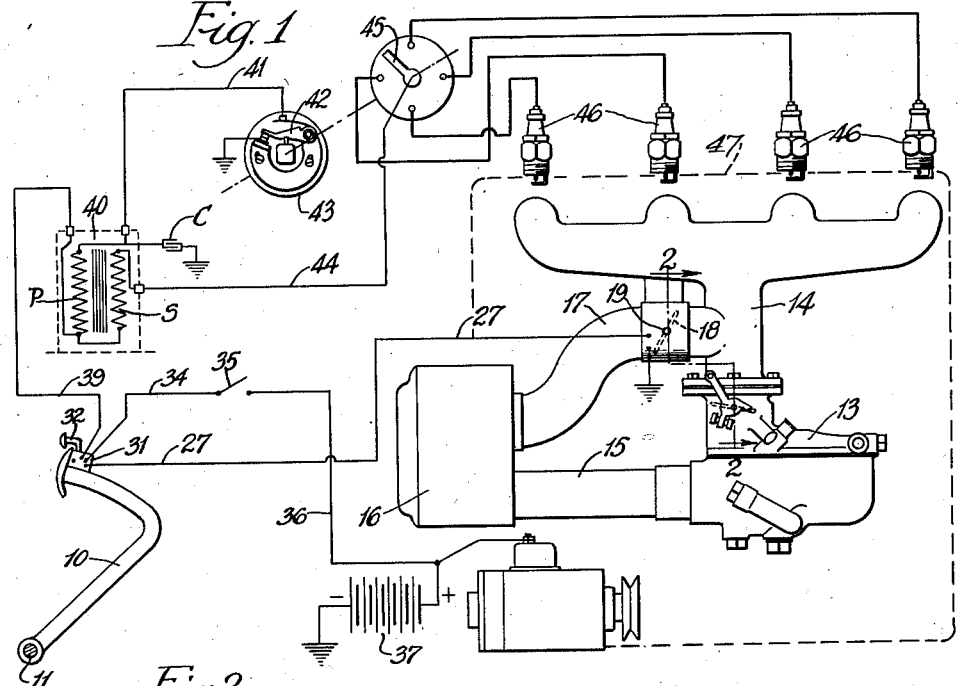
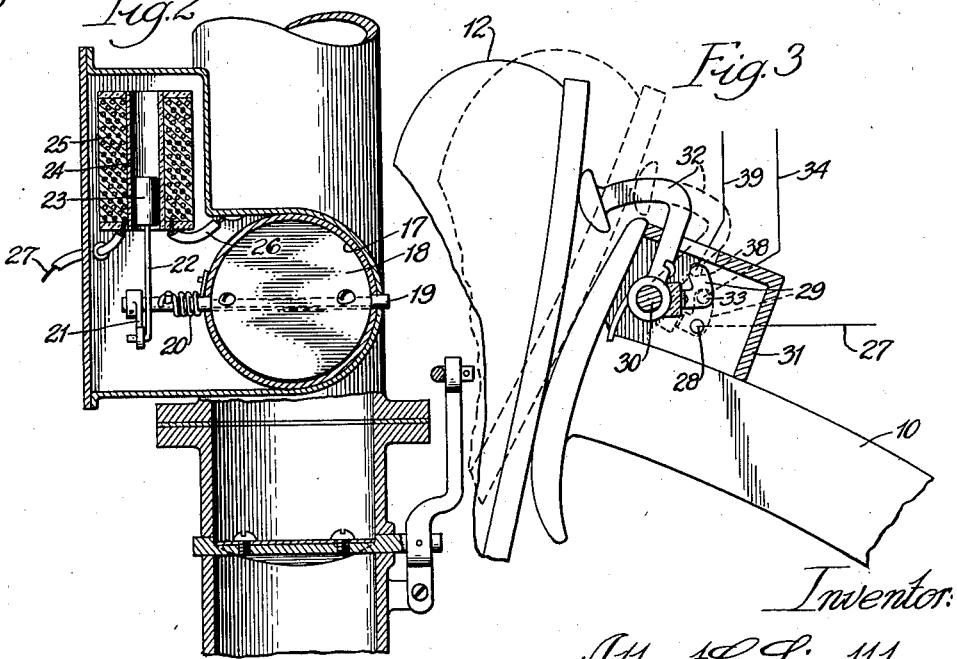
Inventor:
Albert C. Lindbloom,
By Banning & Banning
Attys.

Patented June 1, 1937

2,082,583

UNITED STATES PATENT OFFICE 2,082,583

FUEL SAVING DEVICE

Albert C. Lindbloom, Chicago, Ill., assignor to Lindbloom Auto Parts Company, Chicago, Ill., a corporation of Illinois Application June 2, 1934, Serial No. 728,700

1 Claim. (Cl. 192—3)

An object of this invention is to provide a device for saving fuel in an automobile engine, or the like, particularly during deceleration, and which at the same time serves to brake the engine.

This and other objects, as will hereinafter appear, are accomplished by this invention which is fully described in the following specification and shown in the accompanying drawing, in which—

Figure 1 is a diagrammatic view of an automobile fuelizing and ignition system;

Fig. 2 is a partial enlarged view on the line 2 of Fig. 1; and

Fig. 3 is an enlarged detail of the brake pedal of Fig. 1.

The embodiment illustrated comprises parts of an automobile including a brake pedal 10 secured to an operating shaft 11, which is mounted in suitable journals in the automobile chassis, not shown, in any well known manner, so that pressure of the foot 12 of an operator (Fig. 3) upon the foot pedal will apply the brakes. This view also includes a carburetor 13 of any well known type secured to an intake manifold 14, the carburetor being connected through a pipe 15 with any desired form of air silencer 16.

The present invention includes a by-pass pipe 17, the passage through which is normally closed by a butterfly valve 18. The pipe 17 preferably connects with the silencer 16 so as to diminish the noise of air rushing therethrough when the butterfly valve is open. This butterfly valve is secured to a shaft 19 which passes through the sides of the pipe 17, and in which it is journaled for oscillation. A spring 20 normally holds the butterfly valve in closed position. The shaft has a lever arm 21 to which is connected one end of a rod 22, the opposite end being connected to an iron core 23 which is movable up and down in a suitable tube 24 about which is placed a solenoid coil 25. One end of the coil is grounded to the engine through a lead 26, while the lead 27 leads to a stationary contact 28 which is carried by the brake pedal 10 and is suitably insulated therefrom.

A movable switch arm 29 is carried by a shaft 30 journaled in a suitable housing 31, or the like, the shaft also being insulated from the brake pedal 10. The shaft 30 has an operating finger 32 secured thereto, this finger extending slightly above the top of the brake pedal, and so positioned that the operator's foot in the full line position can depress the brake pedal and operate the brakes without moving the operating finger 32. If, however, he wishes to open the butterfly valve 18 he depresses his foot, as shown in dotted lines, thereby moving the switch arm 29 from the full line position to the dotted line position, at which time this switch arm engages the contact 28. This arm is constantly in engagement with a stationary contact 33 which connects through a lead 34 with the automobile ignition switch 35, and with a lead 36 which connects with the positive terminal of the automobile storage battery 37, the negative terminal being grounded in any well known manner.

Thus it will be seen that as the operator depresses the operating finger 32 either with or without operating the foot pedal, the switch 35 being closed, the solenoid will be energized thereby causing the butterfly valve 18 to open and permitting air to enter the intake manifold, thereby breaking the vacuum so that substantially no fuel will pass through the carburetor to the engine. The switch arm 29 also normally makes engagement with a contact 38 which connects through a lead 39 with one end of the primary coil P of an induction coil 40, the opposite end of the primary being connected to ground through the usual condenser C, and through a lead 41 with a breaker arm 42 of any well known type of make and break device 43, as used on engine distributors, the stationary contact being grounded in a well known manner. The secondary winding S of the induction coil connects at one end with the primary coil, and at the opposite end through a lead 44 with the distributor arm 45 which rotates to distribute sparks to the various spark plugs 46 in the engine 47.

Thus as the operating finger 32 is depressed, the switch arm 29 breaks engagement with the contact 38 and current no longer flows through the primary winding, so that no sparks are produced at the spark plugs until the operating finger 32 is again reached. With an automobile equipped with this device and the automobile in motion, the operator may bring it to a stop by depressing the brake pedal 10 without operating the finger 32, in which case the automobile will be decelerated in the usual manner. If, however, the operator rocks his foot forward to the dotted line position of Fig. 3 at the same time the brake pedal is depressed, he will get an additional brake action due to atmospheric air passing to the cylinders through the intake manifold at the same time that the automobile spark is cut off by movement of the switch arm 29.

In this way the cylinders get a large quantity of air containing no fuel, so that during this instant the engine is acting somewhat as an air compressor, the energy for operating this air compressor being obtained from the momentum of the automobile. In this way very considerable quantities of fuel are saved over the ordinary methods of braking wherein an idling mixture is permitted to pass through the carburetor to the engine and is there ignited in the regular way. Cutting off the current flow to the primary winding of the induction coils means a saving of current, and at the same time permits the coil to cool somewhat.

While I have shown and described but a single embodiment of my invention, it is to be understood that it is capable of many modifications. Changes, therefore, in the construction and arrangement may be made which do not depart from the spirit and scope of the invention as disclosed in the appended claim.

I claim:

In an automobile, an internal combustion engine having an intake manifold, a carburetor connected thereto, a brake pedal, a by-pass for the carburetor having a valve therein, means operably connected to the brake pedal and operable by the operator's foot for opening the by-pass as the brake pedal is operated, an ignition system for the engine, and means operably connected to the last mentioned means for cutting off the ignition before the valve is opened.

ALBERT C. LINDBLOOM.